United States Patent
Savoie-Lavigueur et al.

(10) Patent No.: US 11,780,679 B2
(45) Date of Patent: Oct. 10, 2023

(54) VIBRATORY CONVEYOR FOR CONVEYING ITEMS AND RELATED FILLING MACHINE AND METHODS

(71) Applicant: Blue Sky Ventures (Ontario) Inc., Toronto (CA)

(72) Inventors: Guillaume Savoie-Lavigueur, Coteau-du-lac (CA); Simon Lajoie, Montréal (CA); Alexandre Lebel, Laval (CA); Tim Beaudoin-Wallace, Terrebonne (CA); Mathieu Lafortune, Mascouche (CA)

(73) Assignee: BLUE SKY VENTURES (ONTARIO) INC., Toronto (CA)

( * ) Notice: Subject to any disclaimer, the term of this patent is extended or adjusted under 35 U.S.C. 154(b) by 631 days.

(21) Appl. No.: 16/837,288

(22) Filed: Apr. 1, 2020

(65) Prior Publication Data
US 2020/0317452 A1 Oct. 8, 2020

Related U.S. Application Data

(60) Provisional application No. 62/915,869, filed on Oct. 16, 2019, provisional application No. 62/829,838, filed on Apr. 5, 2019.

(51) Int. Cl.
*B65G 27/24* (2006.01)
*B65G 27/30* (2006.01)
(Continued)

(52) U.S. Cl.
CPC .............. *B65G 27/24* (2013.01); *B65B 35/44* (2013.01); *B65G 27/08* (2013.01); *B65G 27/26* (2013.01);
(Continued)

(58) Field of Classification Search
CPC ........ B65G 27/08; B65G 27/24; B65G 27/26; B65G 27/28; B65G 27/30; B65G 27/32;
(Continued)

(56) References Cited

U.S. PATENT DOCUMENTS 2,444,134 A 6/1948 Hittson
4,373,638 A 2/1983 Schapper
(Continued)

FOREIGN PATENT DOCUMENTS

CA 2749623 A1 2/2013
CA 3038711 A1 5/2018
(Continued)

OTHER PUBLICATIONS

Canadian Intellectual Property Office, International Search and Written Opinion of the International Searching Authority, International Application No. PCT/IB2020/053111, 11 pages (dated Jun. 30, 2020).

*Primary Examiner* — Gene O Crawford
*Assistant Examiner* — Keith R Campbell
(74) *Attorney, Agent, or Firm* — THOMPSON HINE LLP

(57) ABSTRACT

A vibratory conveyor includes a feed tray, an electromagnetic linear actuator and a movable drive train interconnecting the feed tray and the electromagnetic linear actuator such that the electromagnetic linear actuator will move the feed tray during energization of the electromagnetic linear actuator. A sensor assembly is positioned to detect movement of the electromagnetic linear actuator. A controller connected to receive an output of the sensor assembly and connected to control energization of electromagnetic linear actuator, wherein the controller is configured to adjust energization of the electromagnetic linear actuator based upon the output of the sensor assembly. A vibratory conveyor in which the
(Continued)

movable drive train includes at least one parallel spring element therealong is also disclosed.

18 Claims, 14 Drawing Sheets

(51) Int. Cl.
*B65G 27/08* (2006.01)
*B65G 27/26* (2006.01)
*B65B 35/44* (2006.01)

(52) U.S. Cl.
CPC ...... *B65G 27/30* (2013.01); *B65G 2203/0266* (2013.01); *B65G 2203/042* (2013.01); *B65G 2812/0308* (2013.01); *B65G 2812/0396* (2013.01)

(58) Field of Classification Search
CPC .... B65G 2203/0266; B65G 2203/0283; B65G 2203/042; B65G 2203/043; B65G 2203/044; B65G 2812/0308; B65G 2812/0396
See application file for complete search history.

(56) References Cited

U.S. PATENT DOCUMENTS

| | | | |
|---|---|---|---|
| 4,455,496 A | 6/1984 | Dean et al. | |
| 4,913,281 A * | 4/1990 | Muller | B65G 27/08 |
| | | | 267/260 |
| 4,940,850 A | 7/1990 | Satake | |
| 5,148,923 A | 9/1992 | Fraenkel et al. | |
| 5,190,139 A | 3/1993 | Maggioni | |
| 5,209,355 A | 5/1993 | Mindermann | |
| 5,236,092 A | 8/1993 | Krotkov et al. | |
| 5,353,917 A | 10/1994 | Maggioni | |
| 5,379,949 A | 1/1995 | Massen et al. | |
| 5,409,101 A * | 4/1995 | Ahmed | H02K 33/16 |
| | | | 198/750.1 |
| 5,409,901 A | 4/1995 | Ahmed et al. | |
| 5,522,512 A | 6/1996 | Archer et al. | |
| 5,524,746 A | 6/1996 | Massen et al. | |
| 5,638,657 A | 6/1997 | Archer et al. | |
| 5,779,058 A | 7/1998 | Satake et al. | |
| 5,816,386 A | 10/1998 | Carlyle | |
| 5,819,953 A | 10/1998 | Julius et al. | |
| 5,865,990 A | 2/1999 | Novak et al. | |
| 6,179,117 B1 * | 1/2001 | Gilman | B65G 27/30 |
| | | | 198/761 |
| 6,191,859 B1 | 2/2001 | Winterbottom et al. | |
| 6,202,832 B1 | 3/2001 | Evansic | |
| 6,230,875 B1 | 6/2001 | Carlyle | |
| 6,308,822 B1 | 10/2001 | Moran et al. | |
| 6,357,579 B1 * | 3/2002 | Patterson | B65G 27/24 |
| | | | 198/760 |
| 6,363,687 B1 | 4/2002 | Luciano et al. | |
| 6,378,572 B1 | 4/2002 | Neubauer et al. | |
| 6,488,141 B2 | 12/2002 | Pritchard et al. | |
| 6,494,022 B1 | 12/2002 | Aylward | |
| 6,619,470 B2 * | 9/2003 | Thompson | B65G 27/32 |
| | | | 198/761 |
| 6,629,611 B2 | 10/2003 | Satake et al. | |
| 6,631,799 B2 | 10/2003 | Samson | |
| 6,639,167 B1 | 10/2003 | Björk | |
| 6,651,807 B2 | 11/2003 | Baird et al. | |
| 6,659,267 B2 | 12/2003 | Patterson | |
| 6,675,955 B2 * | 1/2004 | Nasser-Moghaddassi | |
| | | | B65G 27/24 |
| | | | 198/769 |
| 6,708,815 B2 | 3/2004 | Kato | |
| 6,736,269 B2 | 5/2004 | Monti | |
| 6,753,640 B2 * | 6/2004 | Kato | B65G 27/24 |
| | | | 310/331 |
| 6,784,996 B2 | 8/2004 | Ikeda et al. | |
| 6,884,956 B2 | 4/2005 | Murata et al. | |
| 6,894,970 B1 | 5/2005 | McDermott, III et al. | |
| 6,925,782 B2 | 8/2005 | Aylward | |
| 7,004,306 B2 | 2/2006 | Baird et al. | |
| 7,100,581 B2 | 9/2006 | Ricco et al. | |
| 7,107,741 B2 | 9/2006 | Monti | |
| 7,111,740 B2 | 9/2006 | Ogawa et al. | |
| 7,216,757 B1 | 5/2007 | Patterson et al. | |
| 7,222,717 B2 | 5/2007 | Monti | |
| 7,222,750 B2 | 5/2007 | Mosca | |
| 7,298,870 B2 | 11/2007 | Ikeda et al. | |
| 7,315,929 B2 | 1/2008 | Barth et al. | |
| 7,339,660 B1 | 3/2008 | Cohn et al. | |
| 7,350,640 B2 | 4/2008 | Blackwall Moulsdale | |
| 7,355,140 B1 | 4/2008 | Afsari | |
| 7,392,640 B2 | 7/2008 | Vasquali | |
| 7,392,897 B2 | 7/2008 | Krell | |
| 7,399,383 B2 * | 7/2008 | Giovinazzo | B65G 27/24 |
| | | | 198/755 |
| 7,480,038 B2 | 1/2009 | Cohn et al. | |
| 7,571,800 B2 | 8/2009 | Hart et al. | |
| 7,656,520 B2 | 2/2010 | Cohn et al. | |
| 7,754,984 B2 | 7/2010 | Sugioka et al. | |
| 7,784,604 B2 | 8/2010 | Boeger et al. | |
| 7,810,632 B2 | 10/2010 | Ohashi | |
| 7,878,366 B2 | 2/2011 | Cicognani | |
| 7,956,623 B2 | 6/2011 | Bassani et al. | |
| 7,968,814 B2 | 6/2011 | Imai et al. | |
| 8,006,468 B2 | 8/2011 | Bassani | |
| 8,051,974 B2 | 11/2011 | Boeger et al. | |
| 8,083,078 B2 | 12/2011 | Omura et al. | |
| 8,102,170 B2 | 1/2012 | Monti | |
| 8,118,174 B2 | 2/2012 | Gnann et al. | |
| 8,220,657 B2 | 7/2012 | Cicognani | |
| 8,225,925 B2 | 7/2012 | Bassani | |
| 8,225,939 B2 | 7/2012 | Nelson et al. | |
| 8,251,204 B1 | 8/2012 | Mazza et al. | |
| 8,285,029 B2 | 10/2012 | Paul et al. | |
| 8,373,081 B2 | 2/2013 | Ackley et al. | |
| 8,436,268 B1 | 5/2013 | Afsari et al. | |
| 8,662,312 B2 | 3/2014 | Ito et al. | |
| 8,770,413 B2 | 7/2014 | Ackley et al. | |
| 8,833,566 B2 | 9/2014 | Ito et al. | |
| 8,857,601 B2 | 10/2014 | Taylor et al. | |
| 8,917,100 B2 | 12/2014 | Monti | |
| 8,960,505 B2 | 2/2015 | Gertitschke et al. | |
| 8,972,049 B2 * | 3/2015 | Tidhar | B65B 5/103 |
| | | | 700/240 |
| 8,984,844 B2 | 3/2015 | Shall | |
| 8,985,342 B2 | 3/2015 | Tanaka | |
| 9,027,759 B2 | 5/2015 | Jones et al. | |
| 9,038,815 B2 | 5/2015 | Kimura et al. | |
| 9,063,096 B2 | 6/2015 | Gertitschke | |
| 9,085,380 B2 | 7/2015 | Monti | |
| 9,097,359 B2 | 8/2015 | Ito et al. | |
| 9,101,962 B2 | 8/2015 | Ackley et al. | |
| 9,132,966 B2 | 9/2015 | Groenewald et al. | |
| 9,181,037 B1 | 11/2015 | Tomlinson et al. | |
| 9,254,965 B2 | 2/2016 | Groenewald | |
| 9,259,766 B2 | 2/2016 | Ackley et al. | |
| 9,296,019 B2 | 3/2016 | Berghmans et al. | |
| 9,415,941 B2 | 8/2016 | Woiler et al. | |
| 9,468,948 B2 | 10/2016 | Ackley et al. | |
| 9,481,526 B1 | 11/2016 | Groenewald | |
| 9,492,849 B2 | 11/2016 | Adams et al. | |
| 9,796,534 B2 | 10/2017 | Bott et al. | |
| 10,046,916 B1 | 8/2018 | Massman et al. | |
| 2001/0019008 A1 | 9/2001 | Gilman | |
| 2001/0019009 A1 | 9/2001 | Gilman | |
| 2003/0034282 A1 | 2/2003 | Safai | |
| 2004/0173031 A1 | 9/2004 | Gicza et al. | |
| 2005/0115807 A1 | 6/2005 | Kostel | |
| 2005/0263375 A1 | 12/2005 | MacKay et al. | |
| 2006/0016735 A1 | 1/2006 | Ito et al. | |
| 2006/0271237 A1 | 11/2006 | Kim | |
| 2007/0108016 A1 | 5/2007 | Eaton et al. | |
| 2007/0125624 A1 | 6/2007 | Massman | |
| 2007/0193858 A1 | 8/2007 | Hillstrom et al. | |

(56) References Cited

U.S. PATENT DOCUMENTS

| | | |
|---|---|---|
| 2008/0307757 A1 | 12/2008 | Heim et al. |
| 2009/0008219 A1 | 1/2009 | Boeger et al. |
| 2009/0020562 A1 | 1/2009 | Rea et al. |
| 2009/0056825 A1 | 3/2009 | Mertens et al. |
| 2009/0255856 A1 | 10/2009 | Gnann et al. |
| 2010/0166499 A1 | 7/2010 | Stenzel |
| 2013/0056398 A1 | 3/2013 | Adams et al. |
| 2013/0092592 A1 | 4/2013 | Singer |
| 2013/0134071 A1 | 5/2013 | Singer |
| 2013/0146512 A1 | 6/2013 | Reynolds et al. |
| 2013/0174519 A1 | 7/2013 | Kershaw et al. |
| 2014/0061103 A1 | 3/2014 | Ito et al. |
| 2014/0116571 A1 | 5/2014 | Bassani |
| 2016/0039614 A1 | 2/2016 | Bott et al. |
| 2016/0244265 A1 | 8/2016 | Maggioni et al. |
| 2016/0250665 A1 | 9/2016 | Lampe |
| 2016/0289007 A1 | 10/2016 | Maggioni |
| 2017/0008036 A1 | 1/2017 | Ackley et al. |
| 2019/0100380 A1 | 4/2019 | Helfenstein |
| 2019/0111455 A1 | 4/2019 | Killmann et al. |
| 2019/0265689 A1 | 8/2019 | Schaefer |

FOREIGN PATENT DOCUMENTS

| | | |
|---|---|---|
| EP | 1276222 A2 | 1/2003 |
| EP | 1281642 A1 | 2/2003 |
| EP | 1214156 B1 | 4/2004 |
| EP | 1737119 A1 | 12/2006 |
| EP | 1541506 B1 | 2/2008 |
| EP | 1899245 B1 | 11/2008 |
| EP | 1731451 B1 | 4/2009 |
| EP | 1535866 B1 | 7/2010 |
| EP | 1967470 B1 | 4/2011 |
| EP | 2335835 A1 | 6/2011 |
| EP | 2208693 B1 | 8/2012 |
| EP | 2664551 A1 | 11/2013 |
| EP | 2484609 B1 | 12/2013 |
| EP | 2671824 A1 | 12/2013 |
| EP | 2777829 A1 | 9/2014 |
| EP | 2787281 A2 | 10/2014 |
| EP | 2835183 B1 | 5/2016 |
| EP | 2578519 B1 | 3/2017 |
| EP | 2896583 B1 | 10/2017 |
| WO | 2010/059036 A1 | 5/2010 |
| WO | 2015/052157 A1 | 4/2015 |
| WO | 2016/132281 A1 | 8/2016 |
| WO | 2017/023469 A1 | 2/2017 |
| WO | 2017/158496 A2 | 9/2017 |
| WO | 2017/167446 A1 | 10/2017 |
| WO | 2017/201906 A1 | 11/2017 |
| WO | 2018/069819 A1 | 4/2018 |
| WO | 2018/087274 A1 | 5/2018 |
| WO | 2018/087316 A1 | 5/2018 |
| WO | 2018/139127 A1 | 8/2018 |
| WO | 2018/153812 A1 | 8/2018 |
| WO | 2018/166894 A1 | 9/2018 |
| WO | 2019/014713 A1 | 1/2019 |
| WO | 2019/017581 A1 | 1/2019 |

* cited by examiner

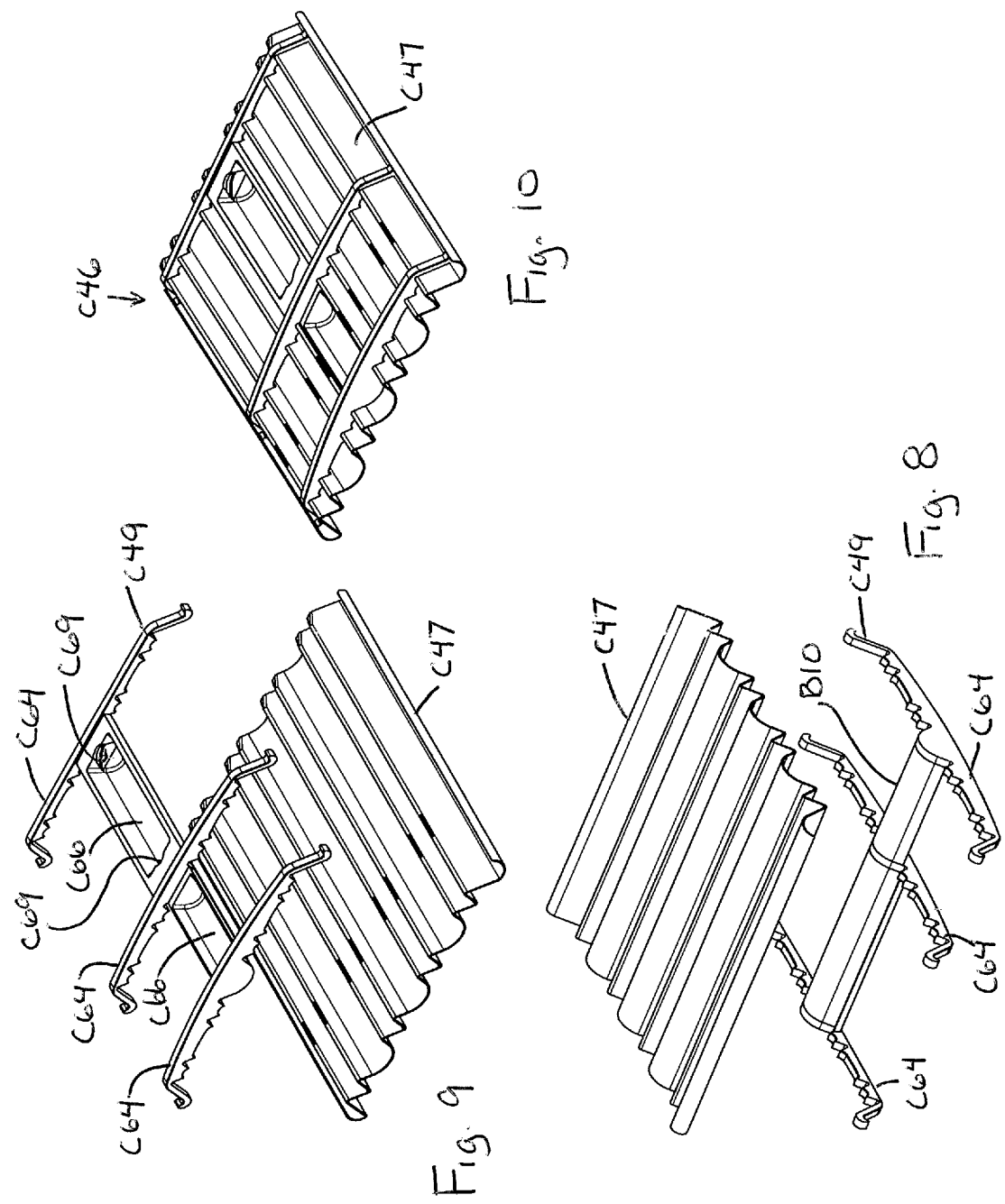

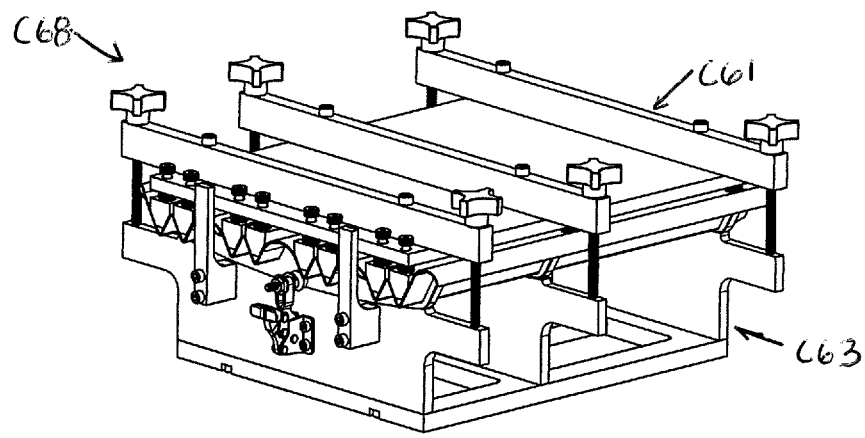
Fig. 11
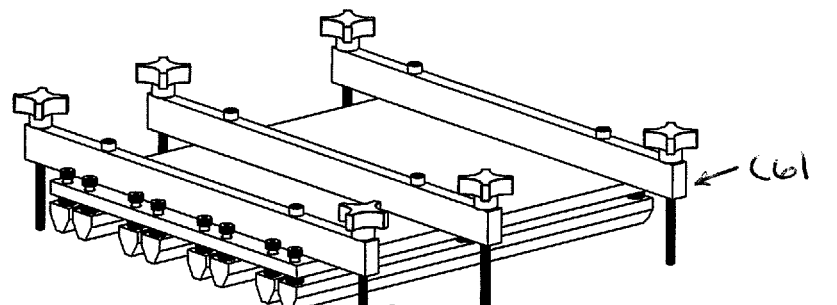
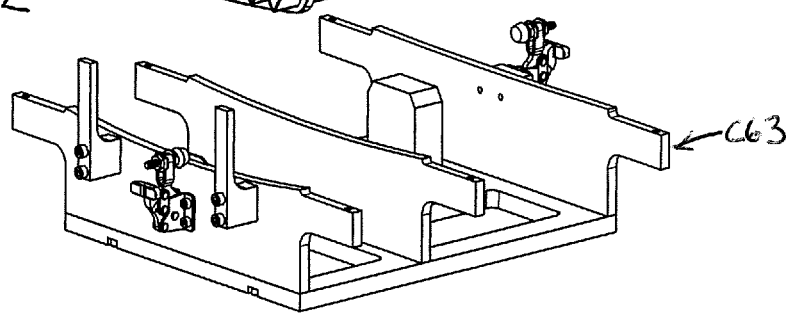
Fig. 12

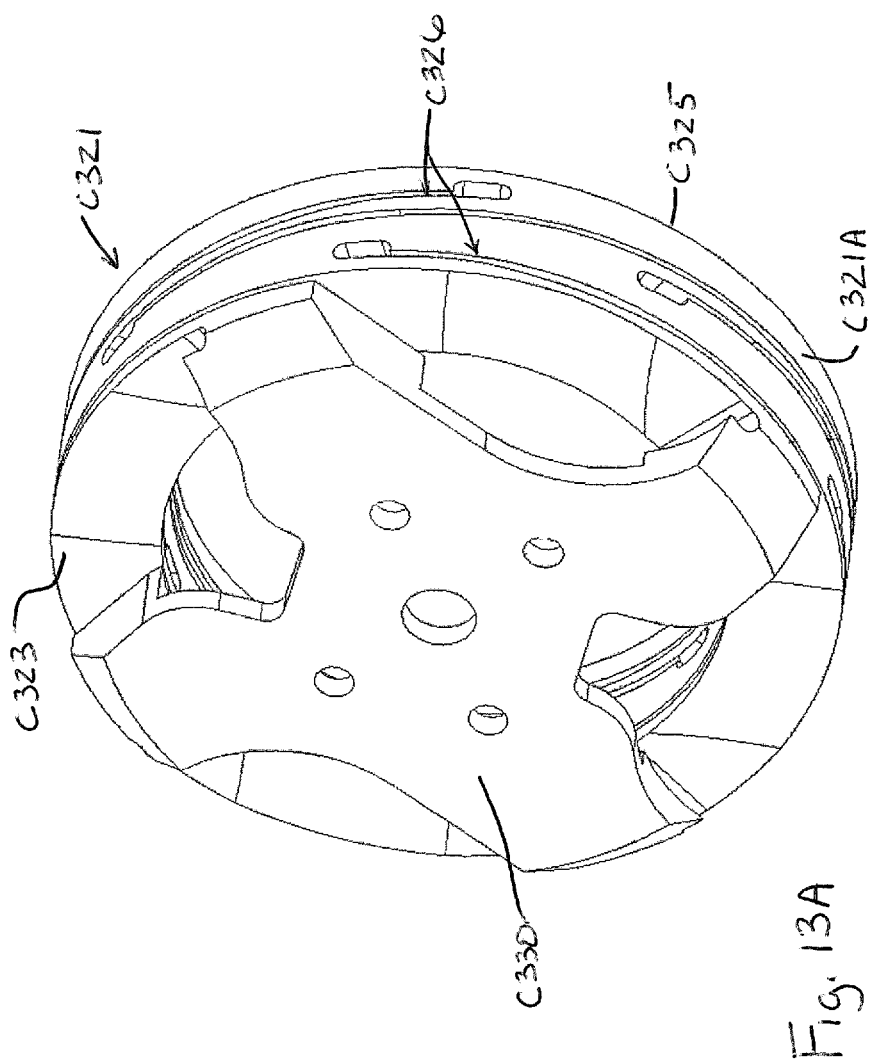

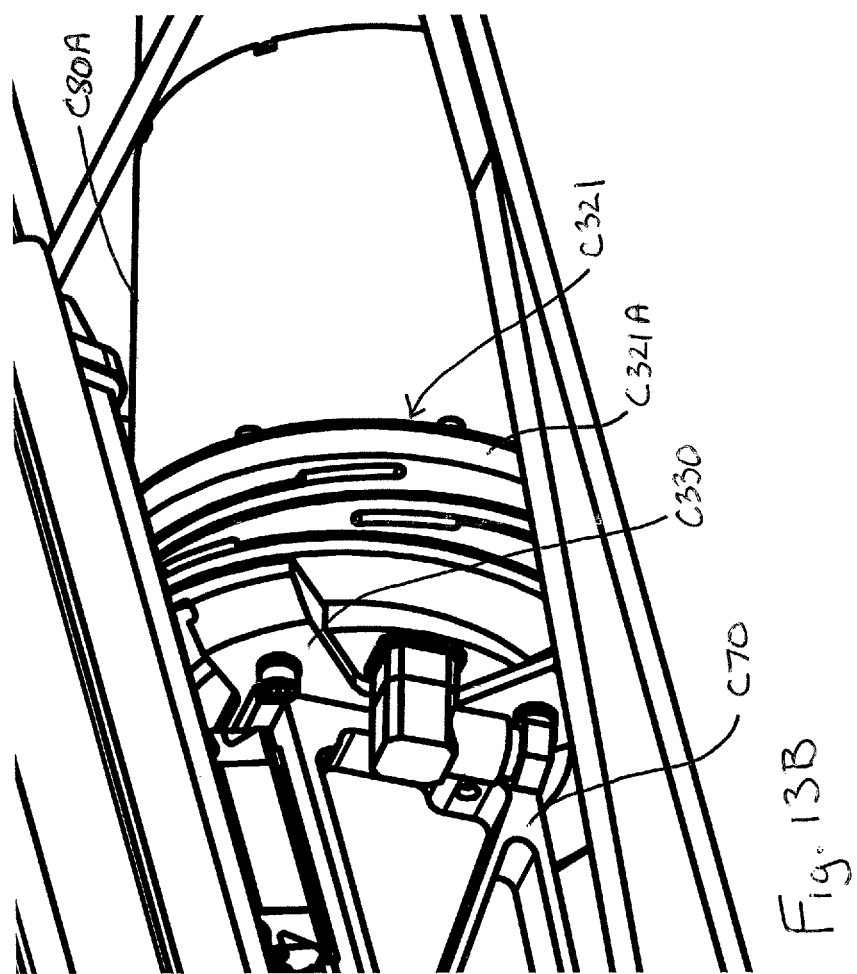

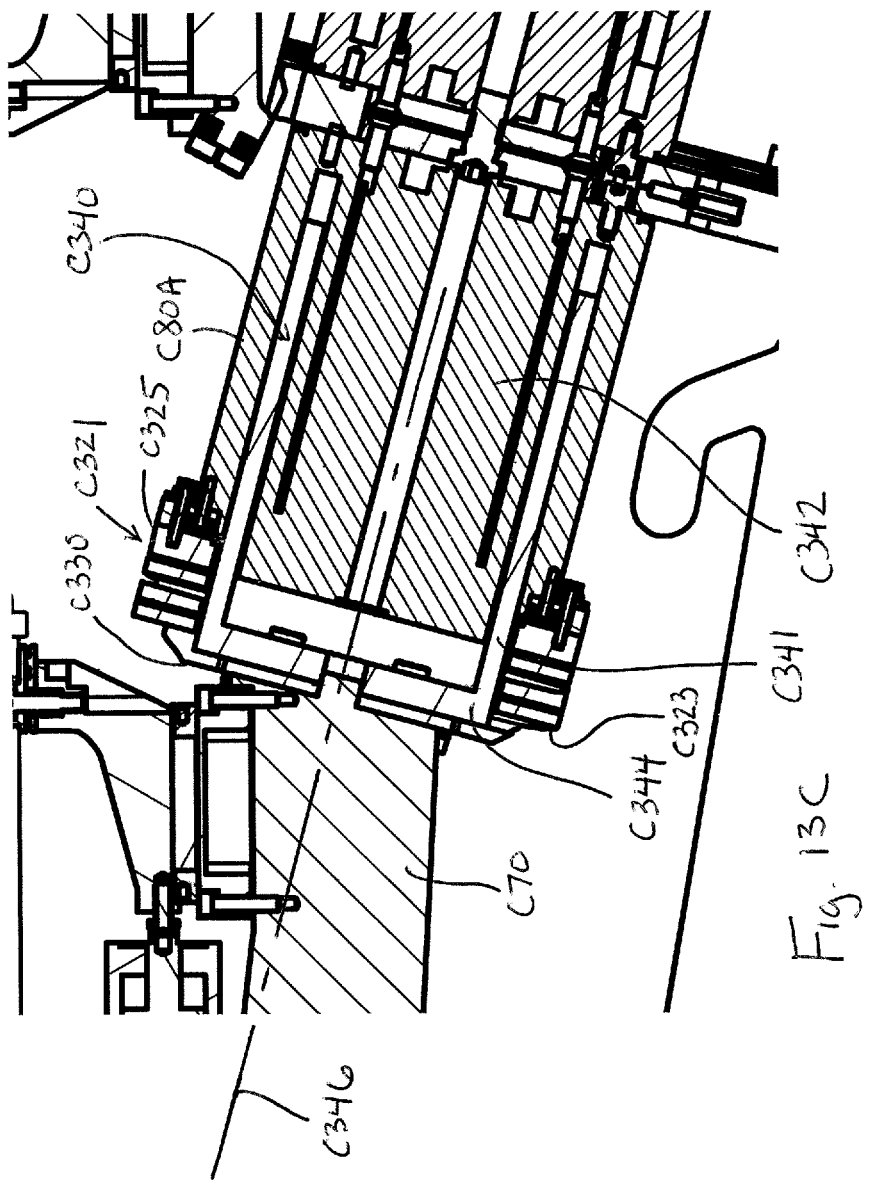

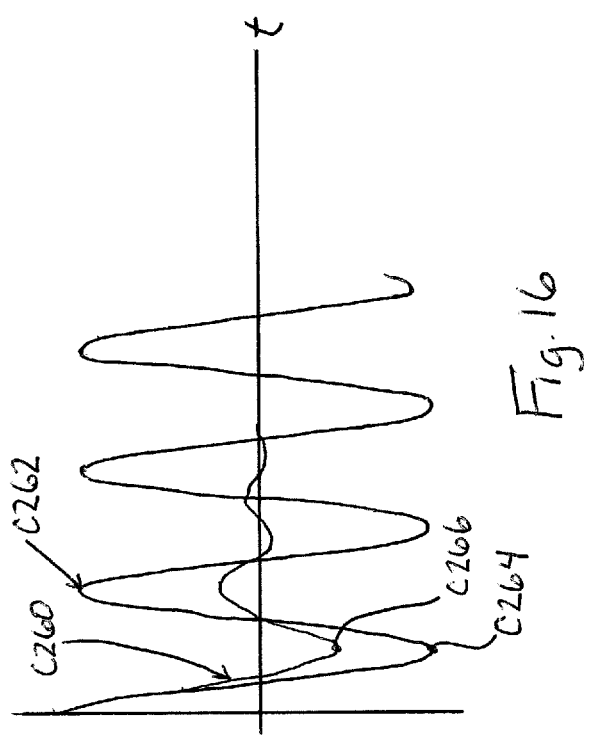

VIBRATORY CONVEYOR FOR CONVEYING ITEMS AND RELATED FILLING MACHINE AND METHODS

TECHNICAL FIELD

This application relates generally to conveying systems for moving items and, more specifically, to a vibratory conveying system of a type that may be used in filling machines in which items are being conveyed, checked, counted and grouped for purposes of filling a container, package or other receptacle with a set number of the items.

BACKGROUND

In the packaging of bulk items, such as pharmaceutical tablets or capsules, the items must be counted and grouped in order to fill containers, packages or other receptacles with a desired number of the items. Conveying the items to particular locations is important in such systems, and a variety of conveyance systems have been used in the past, including vibratory conveyors.

For example, vibratory conveyors that utilize a rotary motor with an eccentric mass are known. These conveyors allow for good frequency control. However, controlling or adjusting the amplitude of the vibration is difficult. The full three-hundred and sixty rotation of the eccentric mass also tends to create excess vibration on the frame of the machine, where it is not desired.

Hydraulic vibratory conveyors are also known and provide for good directional control of the vibration and a high degree of precision. However, such conveyors suffer from a lack of speed, and require the incorporation of an independent system for control of the hydraulic drive. Pneumatic vibratory conveyors provide for higher speeds than hydraulic conveyors but lack precise control of distance/amplitude.

Electric rotary vibratory conveyors utilize a servo-motor coupled with a crankshaft and piston. These systems provide good precision, based upon control of servo-motor speed. However, it is difficult to adjust the amplitude because of mechanical limits inherent in such systems. These systems also suffer from high cost, and high wear, and typically require the use of an oil bath, which is undesirable in most filling machine applications.

Accordingly, an improved vibratory conveyor system for use in filling machines would be desirable.

SUMMARY

In one aspect, a vibratory conveyor includes a feed tray, an electromagnetic linear actuator and a movable drive train interconnecting the feed tray and the electromagnetic linear actuator such that the electromagnetic linear actuator will move the feed tray during energization of the electromagnetic linear actuator. A sensor assembly is positioned to detect movement of the electromagnetic linear actuator. A controller connected to receive an output of the sensor assembly and connected to control energization of electromagnetic linear actuator, wherein the controller is configured to adjust energization of the electromagnetic linear actuator based upon the output of the sensor assembly.

In another aspect, a vibratory conveyor includes a feed tray, an electromagnetic linear actuator and a movable drive train interconnecting the feed tray and the electromagnetic linear actuator such that the electromagnetic linear actuator will move the feed tray during energization of the electromagnetic linear actuator. The movable drive train includes at least one parallel spring element therealong.

In a further aspect, a vibratory conveyor includes a feed tray, an electromagnetic linear actuator including a moving body portion within a fixed housing body and a movable drive train interconnecting the feed tray and the electromagnetic linear actuator such that the electromagnetic linear actuator will move the feed tray during energization of the electromagnetic linear actuator. A flexural end cap is associated with the fixed housing body, wherein the moving body portion of the electromagnetic linear actuator is connected to the flexural end cap such that the flexural end cap guides movement of the moving body portion of the electromagnetic linear actuator.

In yet another aspect, a vibratory conveyor includes a feed tray, a drive system including an actuator, the drive system connected to move the feed tray in a reciprocating manner. The feed tray comprises a titanium material. In one implementation, the feed tray is formed by a titanium component and a non-titanium component fixed together with an adhesive material.

The details of one or more embodiments are set forth in the accompanying drawings and the description below. Other features, items, and advantages will be apparent from the description and drawings, and from the claims.

BRIEF DESCRIPTION OF THE DRAWINGS

FIGS. 8-10 show an exemplary feed tray configuration;

FIGS. 11 and 12 show a jig assembly for production of feed trays;

FIG. 13A shows an embodiment of a flexural end cap;

FIG. 13B shows the end cap on an actuator;

FIG. 13C shows a cross-section with the end cap on the actuator;

FIG. 16 shows exemplary movement curves.

DETAILED DESCRIPTION

Figure 1:
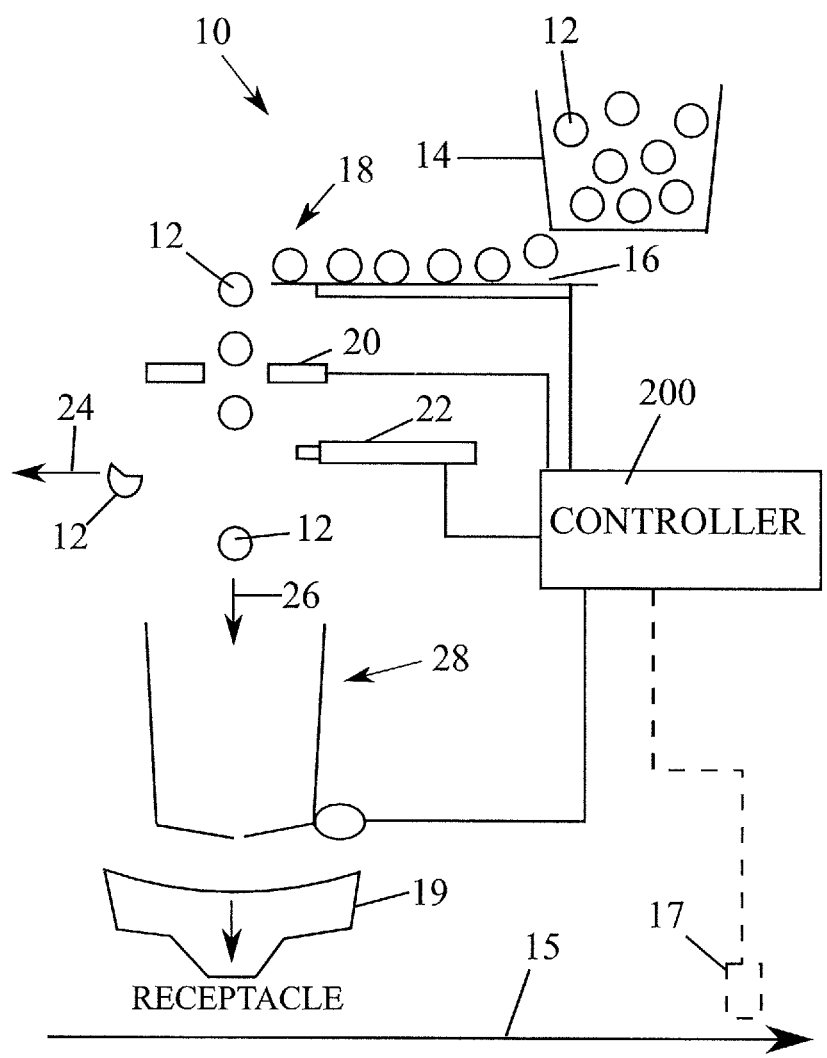
FIG. 1 is schematic depiction of a filling machine.

FIG. 1 shows a schematic depiction of a filling device 10 for conveying, counting and analyzing items 12 and feeding the items 12 to a container, package or other receptacle. By way of example, the items may be solid dose tablets, gelcaps or capsules (e.g., of the pharmaceutical variety) and the filling device may be either intermittent or continuous type. The device 10 includes a bulk feeder 14 that deposits the items 12 to a conveyor 16, which aligns, singulates and spaces the items as they are moved to a drop point 18. The conveyor 16 may, for example, be a vibratory conveyor mechanism, as described in more detail below. As the items 12 fall along an item fall path (e.g., under gravity) they pass a sensor system 20, which counts the items as they pass so that an accurate and controlled fill count can be achieved. The sensor system 20 also analyzes the items for defects. In some cases, a reject mechanism 22 may be provided to move defective items to a reject path 24. For example, in the case of solid dose tablets, chipped tablets such as tablet 12' can be rejected. The reject mechanism could, for example, be a pressurized air unit the delivers a burst of pressurized air to move a defective item out of the item fall path and into the reject path 24. The reject mechanism could alternatively be a flap mechanism selectively movable into the item fall path to divert the item out of the item fall path by contact with the flap mechanism. In other implementations, item reject could occur further downstream in a system (e.g., by using a downstream reject mechanism 17 (e.g. blow nozzle or mechanical pusher) to move a receptacle containing a defective tablet out of the flow of a receptacle conveyance path 15 after the defective tablet is filled into the receptacle). Items 12 that are not rejected follow the fill path 26. A gate system 28 along the fill path 26 may be controlled as desired to achieve delivery of an appropriate item count to a drop chute 19 that feeds receptacles. In a typical filling device, the conveyor 16 may align the items 12 into multiple feed paths that feed the items to multiple drop points, each with a respective sensor system 20, reject mechanism 22 and gating system 28 that feed to a common drop chute 19.

Figure 2:
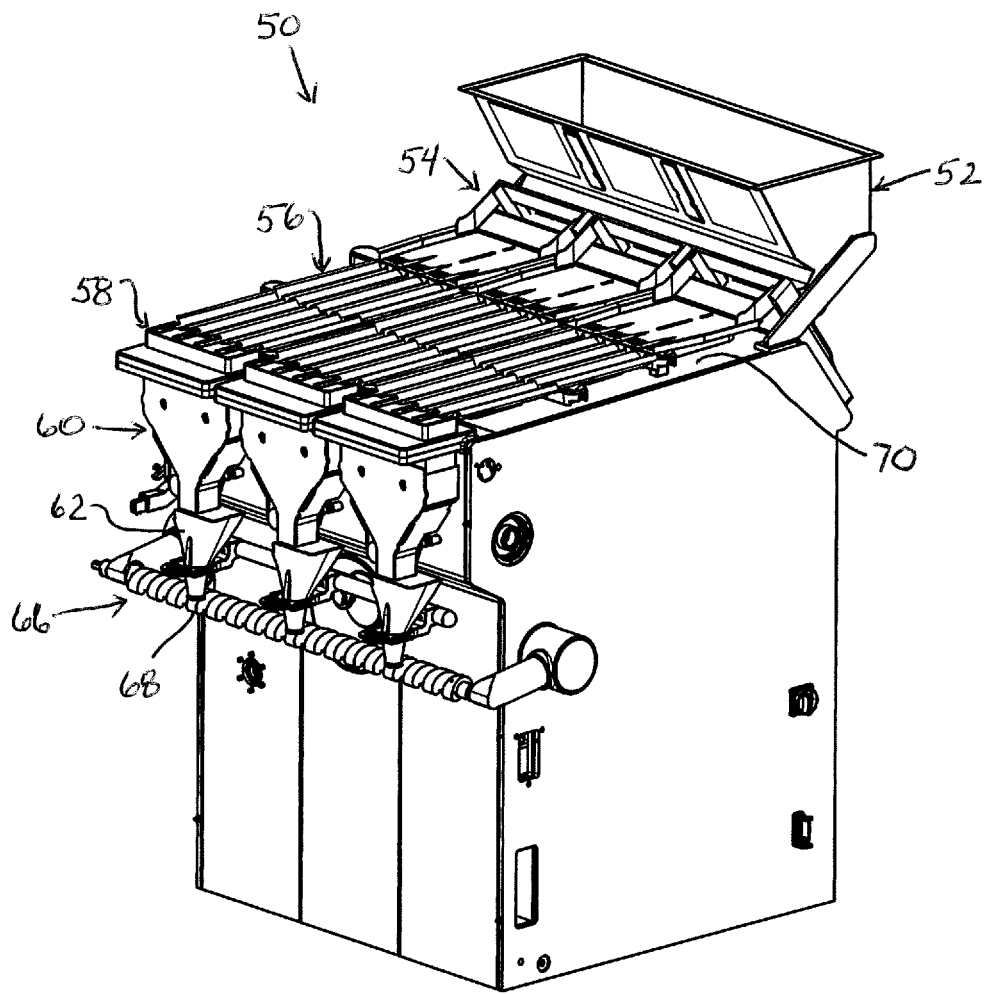
FIG. 2 is a perspective view of an exemplary filling machine.
Figure 3:
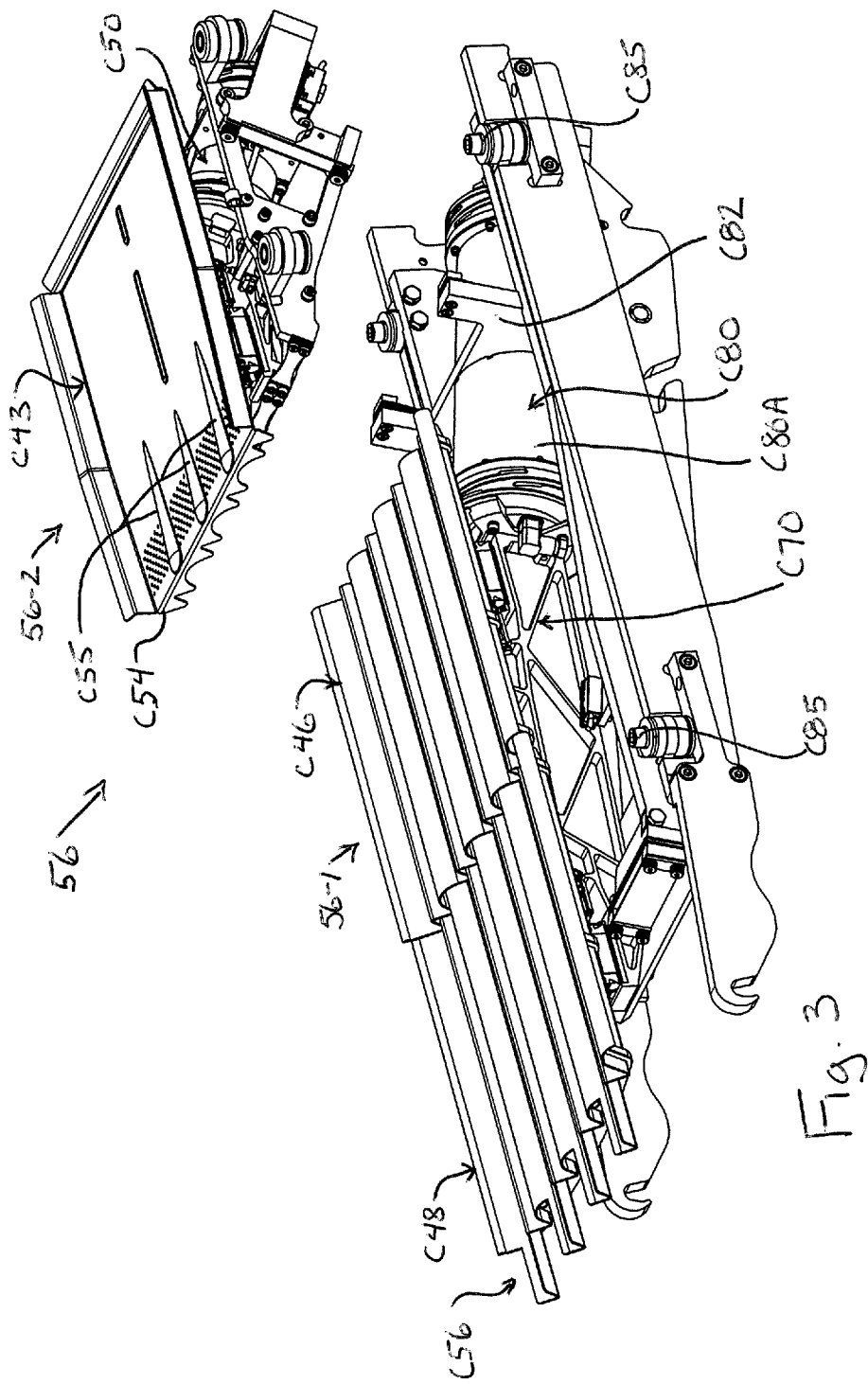
FIG. 3 is a perspective exploded view of one embodiment of a vibratory conveyor assembly of the filling machine.
Figure 4:
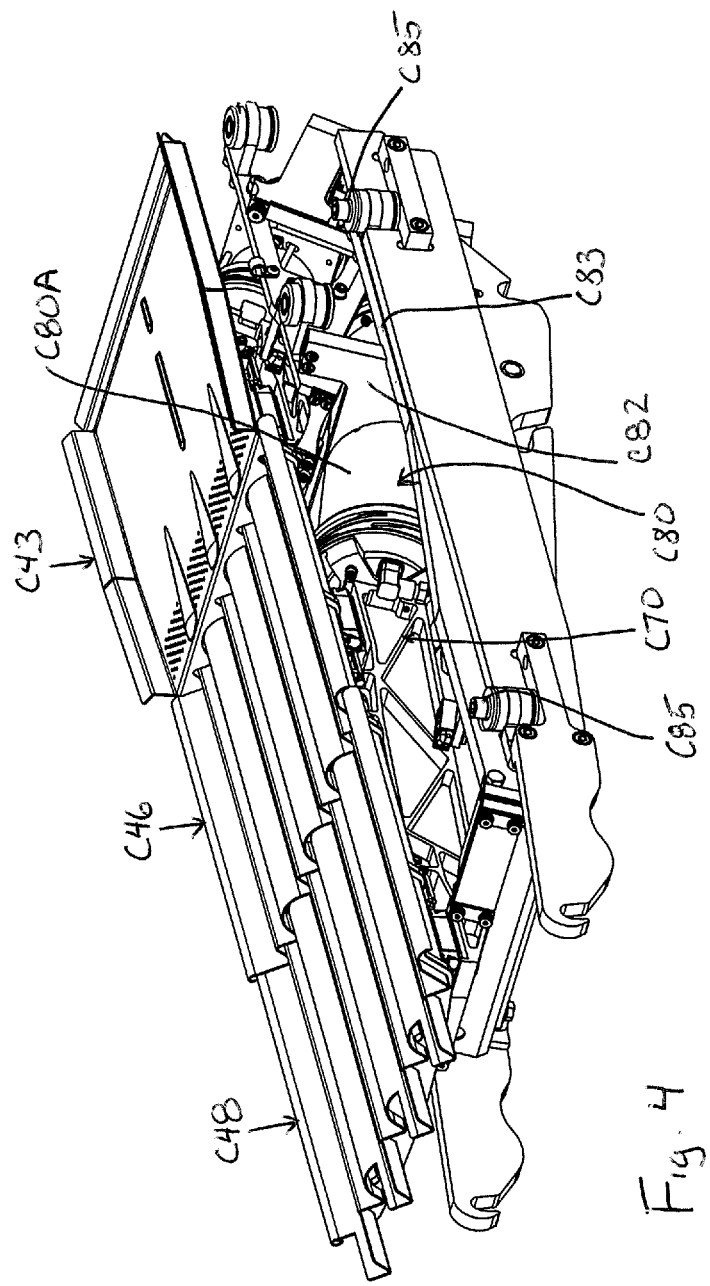
FIG. 4 is a perspective view the vibratory conveyor assembly when in assembled position (housing top plate not shown)

Referring now to FIG. 2, one embodiment of a filling machine 50 is shown, which includes a single bulk item hopper 52 with three side-by-side outfeed sections 54 that each feed to a respective multi-level vibratory conveyor 56 (three side-by-side conveyors shown). Each conveyor conveys items to a respective item sense/count section 58 and gating section 60. Each gating section includes an outlet that feeds into a respective drop chute 62 with a lower outlet opening. The drop chute outlet openings are positioned above a conveyor 66 that moves containers along a conveyance path beneath the drop chute openings, so that items can be dropped into containers moving along the conveyance path. Here, a belt conveyor transports containers, and a rotating feed screw 68 spaces apart the containers to provide a predetermined pitch. Other conveyor types are possible.

FIGS. 3-7 show one embodiment of a multi-level conveyor 56 that includes two separate conveyance sections or assemblies 56-1 and 56-2. The upper section 56-2 includes an initial feed tray C43, and the lower section includes an intermediate feed tray C46 and a distal feed tray C48. Here, the initial feed tray C43 is driven (through any suitable drivetrain) by an electromagnetic linear actuator C50 and both the intermediate feed tray C46 and end feed tray C48 are driven (through any suitable drivetrain) by another, common electromagnetic linear actuator C80. Actuator C50 is part of an electromagnetic actuator assembly C51 that also includes an electromagnetic linear actuator C53 that is oriented in an opposed relationship to actuator C50. Similarly, actuator C80 is part of an electromagnetic actuator assembly C52 that also includes an electromagnetic linear actuator C81 that is oriented in opposed relationship to actuator C80.

In the illustrated embodiments, each electromagnetic linear actuator is formed as a "moving coil" type actuator or "voice coil linear actuator" in which linear motion is achieved by magnetic field interaction between a movable coil (or winding or bobbin) and one or more fixed permanent magnets. However, in alternative implementations the electromagnetic linear actuator may be formed a "moving magnet" type actuator in which the coil (or winding or bobbin) remains fixed and the permanent magnet(s) move linearly.

The initial feed tray C43 is configured differently and driven separately and differently than feed trays C46 and C48 because the function of the initial feed tray C43 is different than that of feed trays C46 and C48. In particular, the initial feed tray C43 is vibrated at a frequency and amplitude intended to cause items to spread out in a relatively uniform manner as they move toward the drop end C54 of the tray. The initial feed tray includes boundary walls at the upstream end and lateral sides. Notably, the upstream portion of the item support surface or body of the initial feed tray is substantially planar and the downstream portion, near the drop end C54, includes a set of rising guide walls C55 that form distinct drop paths C58 that begin to segment the items on the initial feed tray into groups that align with pairs of feed channels C60 formed on the feed tray C46. Here, four drop paths or groupings C58 are formed on the initial feed tray C43, and each drop path or grouping drops into two respective item feed channel paths C60 on the next feed tray C46. However, the number of paths/groupings and the number of channels could vary.

The intermediate and end feed trays C46 and C48 are configured and driven in a manner to singulate the items being conveyed such that only one item at a time drops from the drop end C56 of the end feed tray C48 to move through the item sensing arrangement. Here, the feed trays C46 and C48 take the form of plate structures that are configured to provide a plurality of V-channels, each of which defines a respective feed channel path C60 for items. Here, by way of example, four sets or pairs C62 of adjacent feed paths C60 are provided, where a lateral spacing between the adjacent sets or pairs C62 is larger than the lateral spacing between the adjacent feed paths C60 of each pair.

In the illustrated embodiment, two channeled feed trays C46 and C48 are provided, with feed tray C46 dropping items to feed tray C48. The use of the pair of stepped feed trays C46 and C48 provides an advantage, as compared to a single feed tray having a length comparable to the combined length of trays C46 and C48. In particular, a single long feed tray would tend to flex more when subjected to high acceleration as a result of frequency and stroke length settings for reciprocating movement, reducing or inhibiting desired item feed control, and placing more restrictive limits on the amplitude and speed at which the feed tray could be driven.

In one implementation, in order to maximize feed tray rigidity per unit weight, the feed trays C46 and C48 may be formed of a titanium material (e.g., Titanium Grade 2). Each titanium feed tray is assembled together using an adhesive, such as structural adhesive. In the case of an assembly process using an adhesive, FIGS. 8-10 show a feed tray C46 in which a titanium plate body C47 is stamped to produce a set end profile (profile in end view looking along the feed direction axis or longitudinal axis) that defines the plurality of feed channels extending along the feed direction of the feed tray. A rigid sub-frame C49 is fixed to the titanium plate body bC47 by an adhesive material. The rigid sub-frame C49 extends across a width of the titanium plate body to hold the titanium plate in the set profile, and includes lateral support bars C64 for this purpose. The lateral support bars are interconnected by a central beam B10 having a bottom side that forms a pair of pockets C66, one of which is configured to enable a drive train to be connected thereto. In particular, end sections of one the pockets has end recesses C69 into which opposed expansion clamp arms can be engaged. The rigid sub-frame C49 may be machined from a non-titanium metal or metal alloy (such as aluminum), and has lateral support beams C64 with an upper surface profile that is precisely set to the desired profile for the plate body C47.

As seen in FIGS. 11-12, a jig assembly C68 can be used to position the rigid sub-frame precisely and repeatably on the titanium plate body. Fixture components C61 and C63 come apart from each other. The rigid sub-frame is set into a fixed position on component C63 by use of end clamps. The jig component C61 includes downwardly projecting elongated V-beams to engage the V-channels of the titanium plate body and is used to clamp the titanium plate body down onto the rigid sub-frame until the structural adhesive (applied between the two) cures. The clamping process will also cause the profile of the plate body to conform to the set profile of the lateral support bars C64 to the rigid sub-frame. By way of example, the structural adhesive may be any one of MASTERBOND® EP42HT-2FG: 2 part epoxy, MASTERBOND® EP21TDCSMed: 2 part silver-epoxy, USP Class VI, 3M Scotch-Weld™ 8407: 2 part Acrylic or 3M Scotch-Weld™ DP420: 2 part Epoxy. However, use of other adhesives is also possible. Notably, the use of a structural adhesive to connect the tray components makes precise assembly repeatable as compared to use of a welding process because welding tends to cause thermal expansion and warping, making it difficult to repeat with precision.

Although titanium is preferred for the tray body, in some cases, an aluminum material may be used for the feed trays. In addition, rather than an adhesively assembled tray, a single casting could be used or a single part machined out of solid block could be used, or multiple welded together pieces could be used. In addition, in some embodiments the feed trays need not incorporate titanium material (e.g., a single piece or multipiece feed tray of aluminum or stainless steel). The adhesive assembly process could also be used for feed trays that do not include titanium (e.g., feed tray body of stamped aluminum or stainless plate and rigid sub-frame of stamped aluminum or stainless plate).

Referring again to FIGS. 3-7, the electromagnetic linear actuator C80 is connected to rapidly move a drive train formed in part by a driven frame C70 that includes fixed upwardly extending clamp arms C72 and movable upwardly extending clamp arms C76. The clamp arms engage into the clamping socket recesses at the underside of the rigid-subframe of each feed tray C46 and C48 to connect the drive train to each feed tray. In one implementation, the driven frame C70 may be a machined aluminum, but other materials are also possible (e.g., carbon fiber of stainless steel).

The electromagnetic linear actuator C80 includes a cylindrical housing body C80A that is secured to a mount plate C82 that extends between two side frame plates C83. The side frame plates C83 are in turn fixed to another frame/housing portion of the machine by mounts C85. Here, the mounts are designed to engage with a top plate 70 (FIG. 2) of the machine housing to secure the conveyance assembly C56-1 in place. The top plate 70 remains stationary during the movement of the feed trays, and includes openings through which the clamp arms extend to engage the feed trays. The conveyance assembly 56-2 includes similar mounts to engage the top plate, and similar openings for its clamp arms (mentioned below). Thus, the two separate conveyance sections or assemblies 56-1 and 56-2 can be separately connected to and removed from the top plate 70 of the machine.

Referring again to FIG. 7, the electromagnetic linear actuator assembly C52 includes a rear side with an electromagnetic linear actuator C81, which is connected at the side of plate C82 that is opposite actuator C80, to move a dummy weight C120. The actuators C80 and C81 are operated synchronously, in opposed manner, so that as the driven frame C70 is moved forward (i.e., right to left in FIG. 7) the dummy weight C120 moves rearward, and likewise as the driven frame C70 moves rearward, the dummy weight C120 moves forward. The mass of the dummy weight C120 should, preferably, be such that the total moving mass in the case of actuator C81 is the same as the total moving mass in the case of actuator C80. This configuration and manner of operation of the electromagnetic linear actuator assembly C52 provides dynamic balancing by opposing motion, such that the resulting forces induced by the two actuators C80 and C81 sums to zero or substantially zero. If the force sum is not zero or near zero, undesired oscillation of the whole system could be induced, adversely affecting the ability to achieve the vibration desired for movement of the feed trays in a manner that results in desired movement of the items being conveyed. Moreover, the residual vibration is also transmitted to machine frame, potentially causing undesired noise and other problems (e.g., loosening of fasteners, electrical signal noise, etc.). By balancing the forces using the opposed actuators driving similar mass, more precise vibratory movement of the feed trays can be achieved, with reduced undesirable vibrations that would typically need to be damped by some mechanical structure. Electromagnetic linear actuator C53 is likewise connected to a dummy weight C121 to achieve a similar benefit for the actuator assembly C51 that drives the feed tray C43. The actuator C50 is connected to move a driven frame C71 that includes a fixed upwardly extending clamp arm C73 and a movable upwardly extending clamp arm C77, which clamp arms engage in a clamping socket at the bottom of the feed tray C43.

In the case of both the connection of the electromagnetic linear actuator C80 to the driven frame C70, the connection of the electromagnetic linear actuator C81 to the dummy weight C120, and similarly for the connection of actuator C50 to driven frame C71 and the connection of actuator C53 to dummy weigh C121, spring/flexural elements may be used. By way of example, as seen in FIGS. 13A-13C, a spring/flexure element useable in connection the electromagnetic linear actuators takes the form of an end cap C321 that includes a cylindrical rim C321A which is connectable to the actuator housing C80A, where a series of spiral slots C326 are formed on the rim. At least two spiral slots are provided so that oppositely oriented helical portions are formed on the rim. A mount bracket C330 connects to the rim and forms the end face or end plate of the end cap. The mount bracket C330 is in turn connected (directly or indirectly) to whatever component is to be driven by the actuator (e.g., driven frame C70). The spiral slots 326 allow axial movement of the end portion C323 of the rim C321A from which the mount bracket C330 extends, while the opposite end portion C325 remains fixed on the housing body C80A. The moving coil body C340 of the electromagnetic linear actuator C80 is partially disposed within the stationary housing body C80A, with a cylindrical portion C341 slidable along a gap between the housing C80A and the permanent magnet structure C342 of the actuator. The end face C344 of the coil body is connected to the mount bracket C330. Thus, the driven frame C70, mount bracket C330 and coil body are all rigidly connected to move in unison with each other. The slotted portion of the end cap forms an intermediate flex region along an axial length of the end cap (length in the movement direction of the actuator), and the intermediate flex region is disposed around one of the fixed housing body C80A or the moving coil body portion C341 to maintain alignment of the intermediate flex region with a movement axis C346 of the electromagnetic linear actuator. Here, the cylindrical rim of the end cap is disposed primarily around the moving body portion C341 and the end C325 of the rim connects to the open end of the fixed housing body C80A.

This type of connection functions to guide/align coaxially the moving bobbin/coil in the housing C80A by blocking two degrees of freedom (up/down translation and translation transverse to the axis of motion) while permitting translation along the axis C346.

The coil/bobbin of each electromagnetic linear actuator is energized to produce electrical current through the bobbin. The resulting electromagnetic field has a field orientation dictated by the direction of the electrical current in the conductor. The electromagnetic filed interacts with the magnetic field of the permanent magnet(s) structure C342 to produce movement of the coil/bobbin body C340 into or out of the actuator body C80A depending upon the orientation of the magnetic field produced by the coil.

Figure 5:
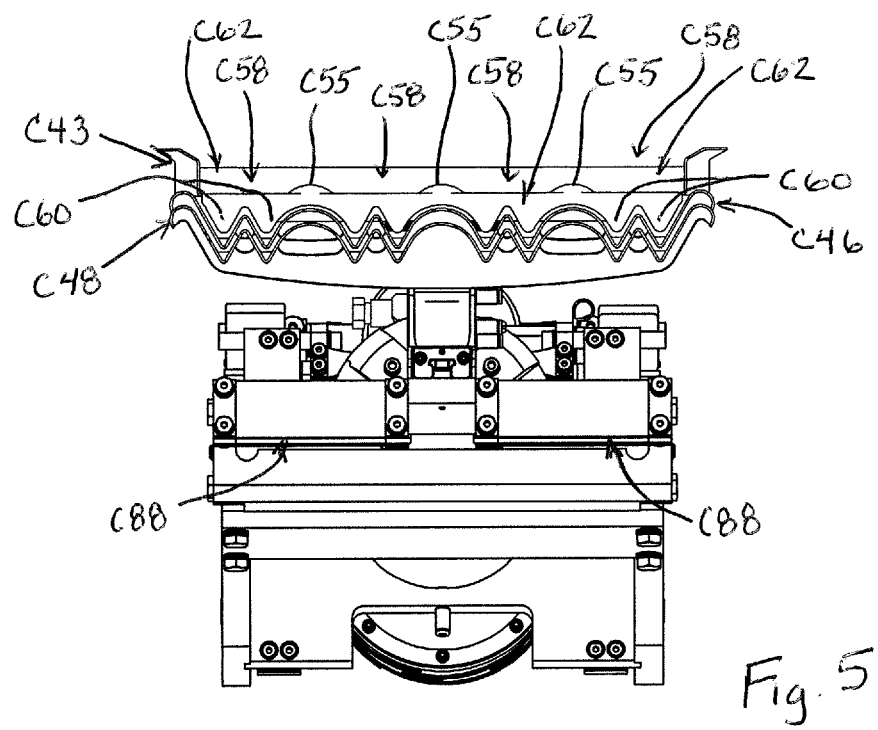
FIG. 5 is a front elevation view of FIG. 4.
Figure 6:
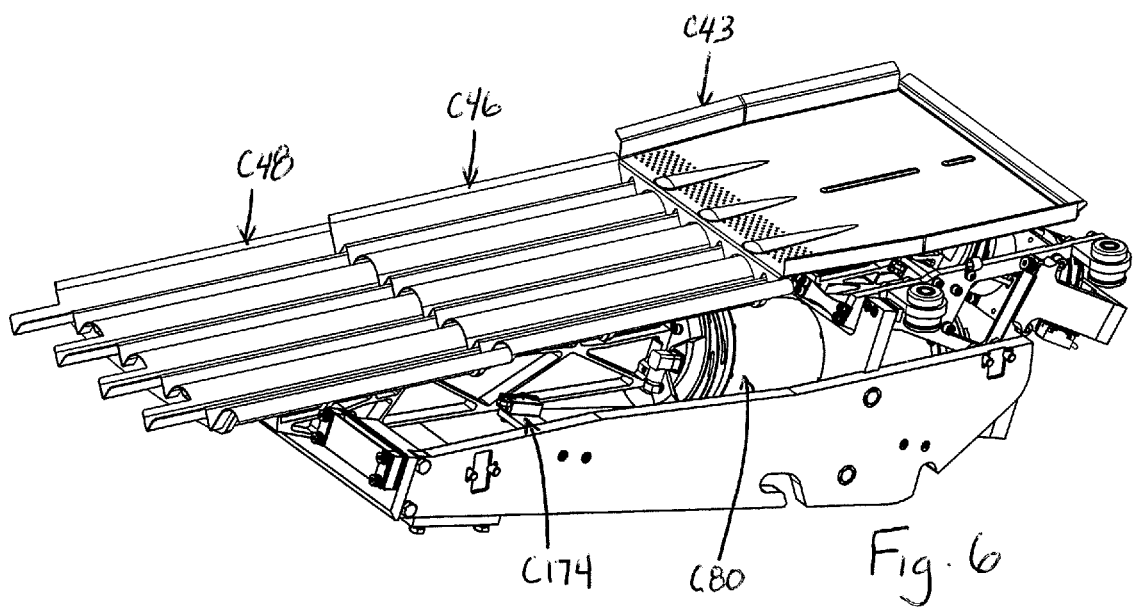
FIG. 6 is another perspective view of the vibratory conveyor assembly.
Figure 7:
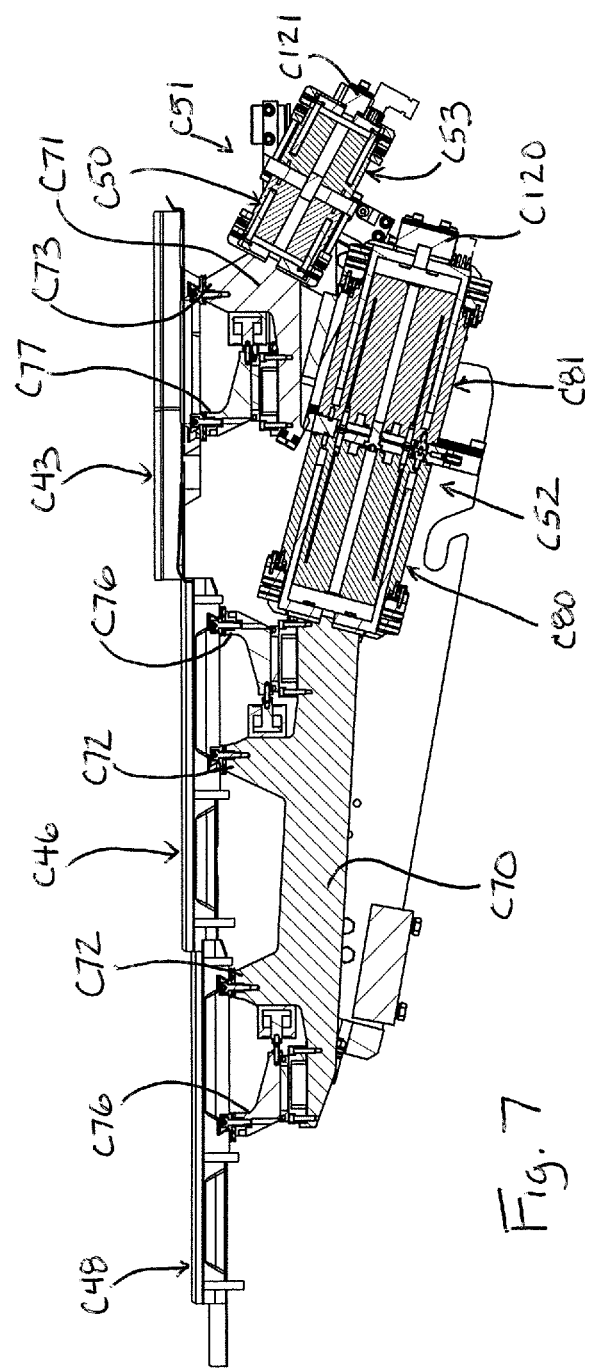
FIG. 7 is a cross-section of the assembly of FIG. 4 taken along a vertical plane running through the longitudinal center axis of the assembly.

As best seen in FIG. 5, the driven frame C70 is connected to the side frame portions of conveyance assembly 56-1 by laterally oriented lamellar steel band segments C88. These connections form flexural support bearings, with the lamellar steel segments bending back and forth during rapid movement of the driven frame C70. These flexural bearings function to guide the vibratory plates by blocking 5 degrees of freedom (sideways translation, up/down translation, and rotation around all three axes), while permitting translation in the motion axis of the electromagnetic linear actuator C80. Thus, the flexural bearings act as a conventional linear bearing or bushing would, but avoid friction contact between moving parts and therefore avoid or substantially eliminate bearing wear problems. More specifically, the outer portion of the flexure elements are held stationary (e.g., by the side frame portions) and linear forces applied to the driven frame C70 cause the flexure elements to bend in an s-shape curve (and slightly stretch) allowing a relative displacement parallel to the movement axis of the electromagnetic linear actuator C80. Similar lamellar mounts for the driven frame C71 of the conveyance assembly 56-2 may be used.

Figure 14:
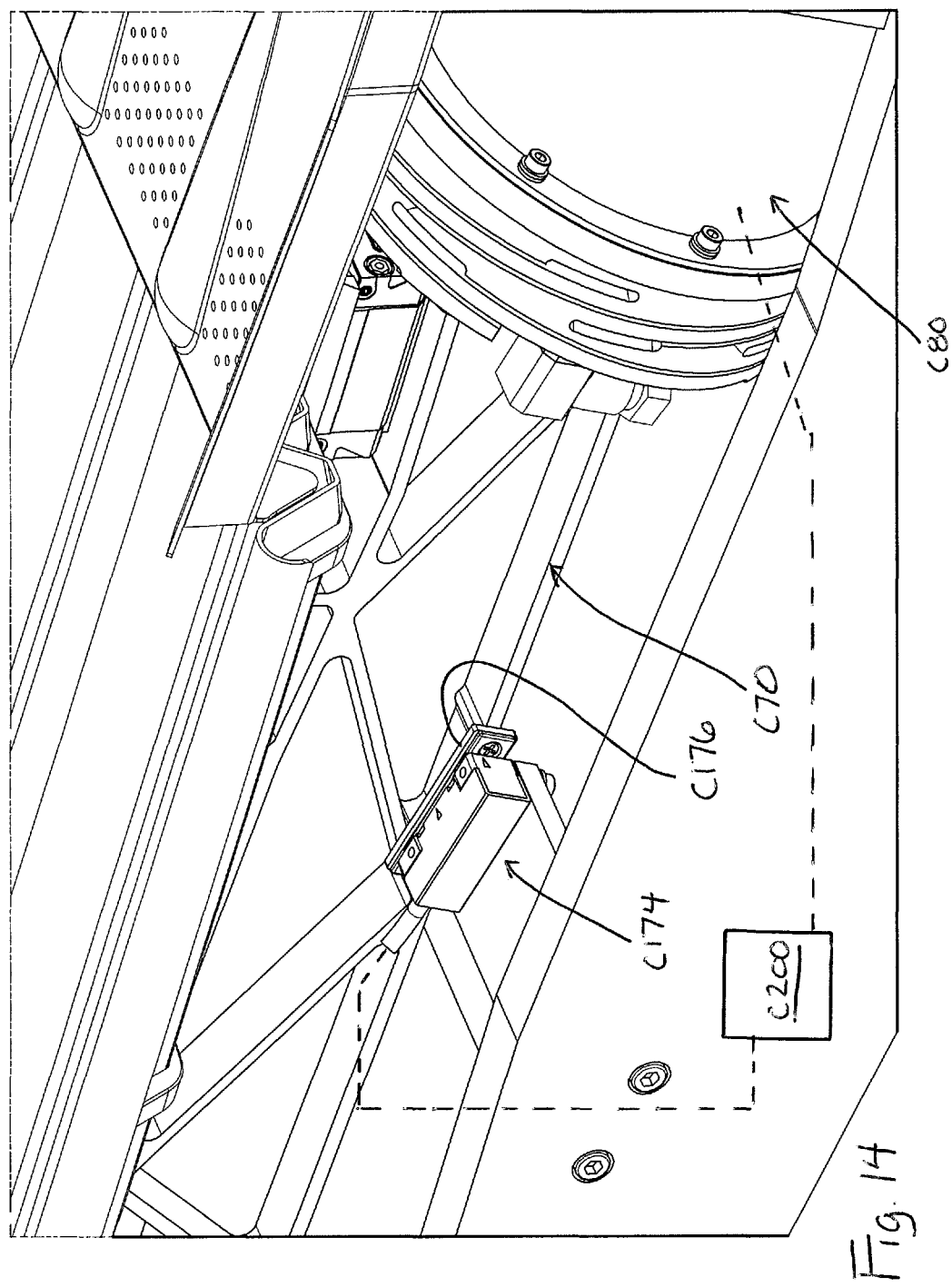
FIG. 14 shows an exemplary sensor feedback control system.

In the case of any of the above-noted electromagnetic linear actuators, a closed loop control of the actuator is preferably provided to enhance performance of the vibratory conveyor. In particular, as schematically depicted in FIG. 14 for electromagnetic linear actuator C80 that drives the driven frame component C70, a sensor C174 is located at a fixed position alongside the driven frame component C70 to detect, for example, movement of detectable indicators C176 on the driven frame component C70. In one example, the sensor C174 is a magnetic sensor and the indicators C176 are magnetic strips. However, other sensor and indicator types are possible (e.g., optical). The sensor information is provided as feedback to the system controller C200, which in turn also controls energization of the actuator C80. The controller C200 uses the data feedback from sensor C174 to compare actual movement (e.g., position, speed and/or acceleration) of component C70 to expected or desired movement of component C70 (e.g., as indicated by a stored reference profile), and makes adjustments to energization of the actuator coil(s) to achieve or maintain the expected or desired movement over time. A P-I-D type feedback control may be utilized. Each of the other actuators C81, C50 and C53 includes its own similar sensor system for feedback control.

The closed loop actuation is important to achieve the previously explained dynamic balancing of opposed actuators. For example, the front actuator C80 driving the font trays C48 and C46, the position control of which is achieved with the sensor C174, is electronically cammed to or synchronized with the rear actuator C81, the position control of which is achieved with a separate sensor. This electronic camming provides consistent synchronized opposed movement of the actuators in order to assure smooth running (low undesirable/residual vibration), and reduces the need for further damping elements.

Figure 15:
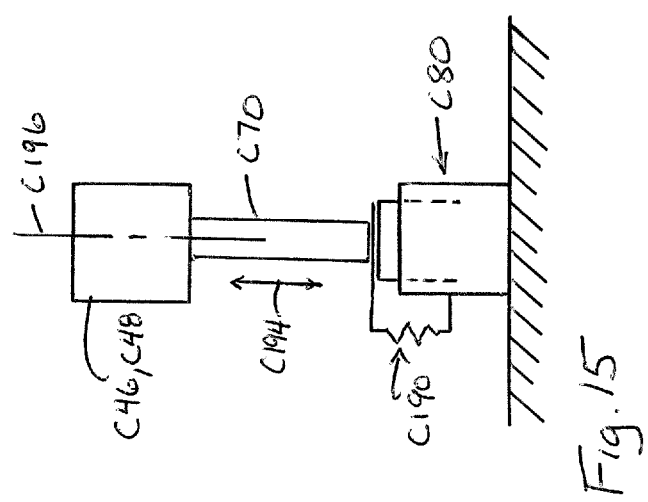
FIG. 15 shows a schematic view of a parallel spring assembly of a drive train.

Performance of the electromagnetic linear actuators is enhanced by the inclusion of parallel spring assemblies for each actuator. By way of example, referring to the schematic of FIG. 15, the driven frame component C70 may be connected mechanically in parallel with a spring assembly C190, such that the spring is repeatedly compressed and expanded as the driven component C70 moves linearly back and forth per arrow C194 along or otherwise in parallel with the movement axis C196 of the actuator. This parallel arrangement is achieved by assuring that both the moving part of the actuator C80 and the driven component C70 are rigidly connected for common movement with the moving portion of the spring assembly C190. In the embodiment, described above, such parallel spring assemblies are formed by the end caps (e.g., C321) of each actuator.

The use of one or more parallel spring assemblies in the drive train acts to store energy and therefore reduces the overall power consumption and reduces the peak force required by the electromagnetic linear actuator to achieve a desired reciprocating motion. When the actuator is in a neutral stationary state, there is no motion and no potential energy. If the actuator is energized to bring the spring element to a compressed position, there is still no motion but there is potential energy stored in the spring. If the hold on the position of the component is then released, and if the actuator is not being energized, the drive assembly will then start to oscillate naturally for some time until it stops again at its neutral position. This movement is a damped harmonic oscillation (e.g., see curve C260 in FIG. 16) made possible by the energy stored in the spring element C192. Such damped harmonic oscillation results from a single pulse of energy (the initial compression of the spring by way of the actuator). However, the system can be excited with a varying amplitude current signal in a manner to achieve a full sinusoidal oscillating motion (e.g., see curve C262). Using the energy of the spring element, the full sinusoidal oscillation motion can be achieved with less electrical current energy delivered to the actuator to drive the mass (e.g., the electrical current provided is the level needed to make up for the variance between the desired physical position of the moving part of the actuator, represented by point C264 on the curve C262, and the physical position that the spring element alone would cause, represented by position C266 on the curve C260). The aforementioned closed-loop control is important to facilitate the necessary application of controlled current amplitude to the actuator. This ideal timing or frequency for the excitation of the system is called the natural frequency at which it requires the least energy input to achieve motion. This natural frequency is a function of the mass and rigidity and therefore is fixed for a given system.

As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group— including hardware or software that executes code), software, firmware and/or other components, or a combination of some or all of the above, that carries out the control functions of the device/machine or the control functions of any component thereof.

It is to be clearly understood that the above description is intended by way of illustration and example only, is not intended to be taken by way of limitation, and that other changes and modifications are possible.

What is claimed is:

1. A vibratory conveyor, comprising:
a feed tray;
an electromagnetic linear actuator;
a movable drive train interconnecting the feed tray and the electromagnetic linear actuator such that the electromagnetic linear actuator will move the feed tray during energization of the electromagnetic linear actuator;
a sensor assembly positioned to detect movement of the electromagnetic linear actuator; and
a controller connected to receive an output of the sensor assembly and connected to control energization of the electromagnetic linear actuator, wherein the controller is configured to adjust energization of the electromagnetic linear actuator based upon the output of the sensor assembly;
wherein the electromagnetic linear actuator is a first electromagnetic linear actuator, wherein the vibratory conveyor includes a second electromagnetic linear actuator, wherein the first electromagnetic linear actuator moves the movable drive train and the feed tray, and the second electromagnetic linear actuator is connected to move a dummy weight and the controller is configured to energize the second electromagnetic linear actuator so as to move the dummy weight substantially opposite to the movable drive train and the feed tray, in order to provide an electromagnetic linear actuator assembly with dynamic balancing via opposing motion in order to reduce transmission of vibration from the vibratory conveyor to a fixed frame/housing supporting the vibratory conveyor.

2. The vibratory conveyor of claim 1 wherein the sensor assembly detects movement of the first electromagnetic linear actuator by monitoring movement of a portion of the movable drive train.

3. The vibratory conveyor of claim 2, wherein the controller is configured to compare feedback signals from the sensor assembly to an intended movement profile, and to adjust energization of the first electromagnetic linear actuator to achieve or maintain the intended movement profile over time.

4. The vibratory conveyor of claim 3, wherein the intended movement profile defines position of the portion of the movable drive train.

5. The vibratory conveyor of claim 1, wherein the sensor assembly is a first sensor assembly, wherein a second sensor assembly is positioned to detect movement of the second electromagnetic linear actuator, and the controller is configured to adjust energization of the first electromagnetic linear actuator and to adjust energization of the second electromagnetic linear actuator in order to maintain substantially synchronized and opposed movement of the first electromagnetic linear actuator and the second electromagnetic linear actuator.

6. The vibratory conveyor of claim 1,
wherein the movable drive train includes at least one spring element therealong between the first electromagnetic linear actuator and the feed tray;
wherein the spring element has a fixed portion and a moving portion;
wherein both (i) a moving part of the first electromagnetic linear actuator is connected to move in unison with the moving portion of the spring element and (ii) a segment of the drive train between the moving portion of the spring element and the feed tray is connected to move in unison with the moving portion, such that the feed tray also moves in unison with the moving portion of the spring element.

7. The vibratory conveyor of claim 6, wherein the spring element comprises oppositely oriented helical portions.

8. The vibratory conveyor of claim 7,
wherein the first electromagnetic linear actuator includes a stationary cylindrical housing body in which a coil body of the first electromagnetic linear actuator is partially disposed;
wherein the spring element is formed on a flexural end cap positioned at one end of the cylindrical housing body, wherein the flexural end cap is part of the movable drive train.

9. The vibratory conveyor of claim 8, wherein the spring element is formed by a cylindrical rim of the flexural end cap, wherein the cylindrical rim includes at least first and second spiral slots therein to form the oppositely oriented helical portions.

10. The vibratory conveyor of claim 1,
wherein the feed tray comprises a titanium plate body adhesively connected to at least one support frame component.

11. The vibratory conveyor of claim 1,
wherein the feed tray includes:
a metal plate body stamped to produce a set profile that defines a plurality of feed channels extending along a feed direction of the feed tray; and
a rigid sub-frame fixed to the metal plate body by an adhesive material, wherein the rigid sub-frame extends across a width of the metal plate body to hold the metal plate body in the set profile.

12. The vibratory conveyor of claim 11, wherein the metal plate body is a titanium plate body.

13. The vibratory conveyor of claim 1, wherein the movable drive train is at least in part supported by at least one flexural element formed by one or more laminar steel plates that bend during movement of the movable drive train.

14. The vibratory conveyor of claim 1, wherein the feed tray is one feed tray of a feed tray assembly, and the vibratory conveyor further comprises an additional feed tray that is operatively driven by an additional electromagnetic linear actuator that is separate from the first electromagnetic linear actuator that drives the one feed tray.

15. A filling machine including the vibratory conveyor of claim 1, wherein a discharge end of the vibratory conveyor is located such that items traveling along the vibratory conveyor drop along a fall path that includes a sensor assembly for sensing the items.

16. A vibratory conveyor, comprising:
a feed tray;
a first electromagnetic linear actuator;
a movable drive train interconnecting the feed tray and the first electromagnetic linear actuator such that the first electromagnetic linear actuator will move the movable drive train and the feed tray during energization of the first electromagnetic linear actuator;
a dummy weight;

a second electromagnetic linear actuator operatively connected to drive the dummy weight during energization of the second electromagnetic linear actuator;

a controller connected to control energization of the first electromagnetic linear actuator and the second electromagnetic linear actuator so as to move the dummy weight substantially opposite to the movable drive train and the feed tray, in order to provide an electromagnetic linear actuator assembly with dynamic balancing via opposing motion.

17. The vibratory conveyor of claim 16, wherein the controller is configured to adjust energization of the first electromagnetic linear actuator and to adjust energization of the second electromagnetic linear actuator in order to maintain substantially synchronized and opposed movement of the first electromagnetic linear actuator and the second electromagnetic linear actuator.

18. A filling machine including the vibratory conveyor of claim 16, wherein a discharge end of the vibratory conveyor is located such that items traveling along the vibratory conveyor drop along a fall path that includes a sensor assembly for sensing the items.

\* \* \* \* \*